United States Patent
Jang et al.

(10) Patent No.: US 9,306,423 B2
(45) Date of Patent: Apr. 5, 2016

(54) MOTOR WITH VARIABLE MAGNET FLUX

(71) Applicant: NEW MOTECH CO., LTD., Gwangju (KR)

(72) Inventors: Jeong Cheol Jang, Gwangju (KR); Je Hyung Seo, Gwangju (KR); Soo Hyun Park, Gwangju (KR); Woon Pil Jung, Sunchun-si (KR); Hugh Jin Cho, Gwangju (KR); Seung Jae Lee, Gwangju (KR); Byung Taek Kim, Gunsan-si (KR); Jin Seok Jang, Gimje-si (KR)

(73) Assignee: NEW MOTECH CO., LTD, Gwangju (KR)

( * ) Notice: Subject to any disclaimer, the term of this patent is extended or adjusted under 35 U.S.C. 154(b) by 231 days.

(21) Appl. No.: 14/042,741

(22) Filed: Oct. 1, 2013

(65) Prior Publication Data
US 2014/0152135 A1  Jun. 5, 2014

(30) Foreign Application Priority Data
Dec. 3, 2012 (KR) ........................ 10-2012-0139158

(51) Int. Cl.
*H02K 1/27* (2006.01)
*H02K 1/02* (2006.01)

(52) U.S. Cl.
CPC ............... *H02K 1/2786* (2013.01); *H02K 1/02* (2013.01)

(58) Field of Classification Search
CPC .............. H02K 1/2786; H02K 1/27–1/1793; H02K 21/12; H02K 21/14
USPC ............................. 310/67 R, 156.01–156.84
See application file for complete search history.

(56) References Cited

U.S. PATENT DOCUMENTS

| | | | | |
|---|---|---|---|---|
| 2009/0115361 | A1* | 5/2009 | Nitta | 318/400.09 |
| 2010/0126234 | A1* | 5/2010 | Maekawa | 68/28 |
| 2010/0307201 | A1* | 12/2010 | Shiga | D06F 37/304 68/140 |

FOREIGN PATENT DOCUMENTS

| | | | | |
|---|---|---|---|---|
| JP | 2001-258189 A | | 9/2001 | |
| JP | 2001258189 A | * | 9/2001 | ............... H02K 1/27 |
| JP | 2009-112454 A | | 5/2009 | |
| JP | 2010-148180 A | | 7/2010 | |
| KR | 10-2007-0058870 A | | 6/2007 | |
| KR | 10-2010-0080562 A | | 7/2010 | |
| KR | 10-2011-0009876 A | | 1/2011 | |

OTHER PUBLICATIONS

Hwang Bin Lim et al., "Permanent Magnet Demagnetization Characteristics Analysis of a Variable Flux Memory Motor Using Coupled Preisach Modeling and FEM", Proceeding of the KIEEME Annual Summer Conference, pp. 1003-1004, Jul. 18-20, 2007.

(Continued)

*Primary Examiner* — Thomas Truong
(74) *Attorney, Agent, or Firm* — Revolution IP, PLLC

(57) ABSTRACT

Disclosed therein is a motor with a variable magnetic flux, which includes a rotor and a stator located inside the rotor. The rotor includes a rotor housing, a plurality of unit rotor cores and magnets which are attached to the inner wall surface of the rotor housing, and the unit rotor cores and the magnets are arranged in turn. The stator includes a stator core base and a plurality of teeth radially formed on the outer peripheral surface of the stator core base at equal intervals, and each of the teeth has ears formed at both sides of an end thereof.

2 Claims, 6 Drawing Sheets

(56) References Cited

OTHER PUBLICATIONS

Gi-bok Kim et al., Re-Demagnetization Operation Characteristics Analysis of a Variable Flux Memory Motor Using Coupled Preisach Modeling and FEM, Proceeding of the KIEEME Annual Summer Conference, pp. 905-907, Jul. 14-16, 2004.

* cited by examiner

MOTOR WITH VARIABLE MAGNET FLUX

CROSS REFERENCE TO PRIOR APPLICATIONS

This application claims priority under 35 U.S.C. §119 to Korean Patent Application No. 10-2012-0139158, filed on Dec. 3, 2012, which is hereby incorporated by reference in its entirety.

BACKGROUND OF THE INVENTION

1. Field of the Invention

The present invention relates to a motor. More particularly, the present invention relates to a new structure of a motor, which can be operated at a variable speed by demagnetizing or magnetizing some of magnets applied to a rotor and can obtain high efficiency by concentrating an amount of magnetic flux.

2. Background Art

In general, in order to simultaneously obtain a variable speed operation and high efficiency of a motor, various structures and forms of motors have been proposed.

Representatively, there are a variable flux memory motor (VFMM) (hereinafter, called "prior art 1") and a motor disclosed in Japanese Patent Laid-open No. 2009-112454 (hereinafter, called "prior art 2").

A rotor of the variable flux memory motor according to the prior art 1 is basically similar with a brushless DC electric motor (BLDC motor) of a spoke type. The motor is a motor that permanent magnets are demagnetized from a narrower part thereof due to a difference in thickness of the permanent magnets when a negative d-axis current flows to a d-axis which is a magnetic flux generation axis of a stator. The motor is operated at a variable speed by demagnetizing and magnetizing the permanent magnets based on the above principle.

The motor according to the prior art 2 is basically similar with an outer-rotor type BLDC motor of a salient pole concentrated winding structure. The motor is characterized in that two kinds of magnets with different coercive forces are embedded in a rotor core in such a way as to be arranged in a circumferential direction in turn to thereby form opposite poles. That is, the rotor core has holes for embedding a first magnet and a second magnet therein and protrusions formed on an inner face of the rotor core. Accordingly, the motor according to the prior art 2 has several problems in that the rotor core is complicated in structure and manufacturing costs are increased. Particularly, the first magnet is a neodymium (Nd) magnet, and it is the factor in an increase of manufacturing costs.

In order to solve the above problems of the prior arts, the inventors of the present invention propose a new structure of a motor that includes a rotor of a modified spoke type and a stator of a salient pole concentrated winding structure to thereby concentrate an amount of magnetic flux, to cause a high performance enhancement, and to reduce manufacturing costs.

SUMMARY OF THE INVENTION

Accordingly, the present invention has been made to solve the above-mentioned problems occurring in the prior arts, and it is an object of the present invention to provide a motor with a variable magnetic flux of a new structure.

The above and other objects, features and advantages of the present invention will be apparent from the following detailed description of the preferred embodiments of the invention.

To achieve the above objects, the present invention provides a motor with a variable magnetic flux, which includes a rotor and a stator located inside the rotor, wherein the rotor includes a rotor housing, a plurality of unit rotor cores and magnets which are attached to the inner wall surface of the rotor housing, and the unit rotor cores and the magnets are arranged in turn, and the stator includes a stator core base and a plurality of teeth radially formed on the outer peripheral surface of the stator core base at equal intervals, and each of the teeth has ears formed at both sides of an end thereof.

The magnets are divided into first magnets and second magnets. The second magnets are constituted of magnets located at both sides of a pair of opposed unit rotor cores and magnets located at both sides of a pair of unit rotor cores where a connection lines for connecting the two opposed unit rotor cores and a perpendicular line meet each other. The first magnets are the remaining magnets except the second magnets and the second magnets occupy just a part of a space formed by two unit rotor cores of both sides thereof.

The first magnets are ferrite magnets and the second magnets are alnico magnets.

The spacers occupy the remaining space of the space formed by the neighboring unit rotor cores of the second magnets, except the space that the second magnets occupy.

The second magnets respectively have the width crossing the space formed by the two unit rotor cores of the both sides thereof so as to get in contact with the two unit rotor cores.

The variable magnetic flux motor according to the present invention is simple in structure, and can reduce manufacturing costs and cause a high performance enhancement because it is favorable to concentration of the amount of magnetic flux.

BRIEF DESCRIPTION OF THE DRAWINGS

The above and other objects, features and advantages of the present invention will be apparent from the following detailed description of the preferred embodiments of the invention in conjunction with the accompanying drawings, in which.

Hereinafter, reference will be now made in detail to the preferred embodiment of the present invention with reference to the attached drawings.

DETAILED DESCRIPTION OF THE PREFERRED EMBODIMENT

Figure 1:
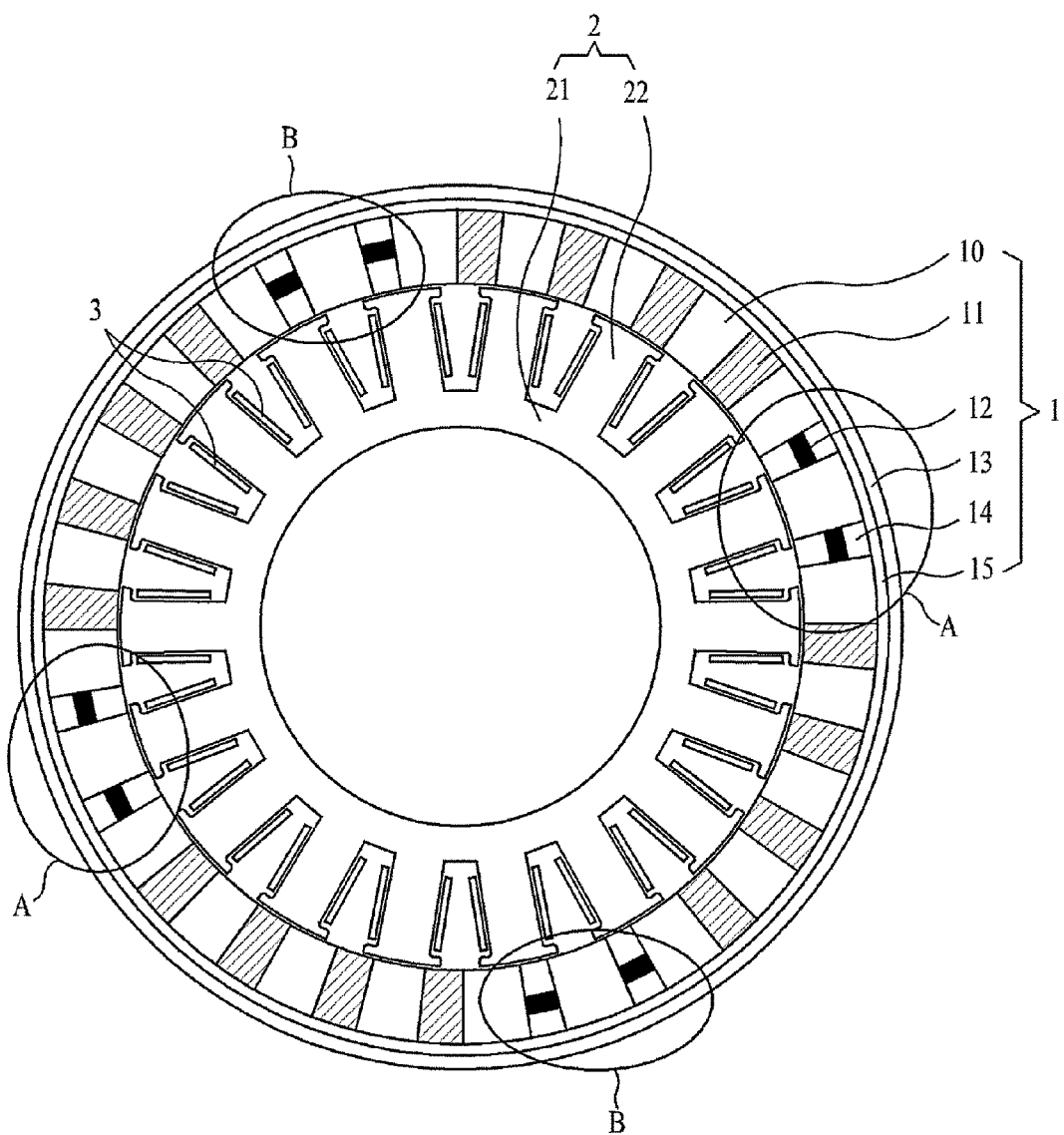
FIG. 1 is a plan view of a structure of a rotor of a motor with a variable magnetic flux according to the present invention.
Figure 2:
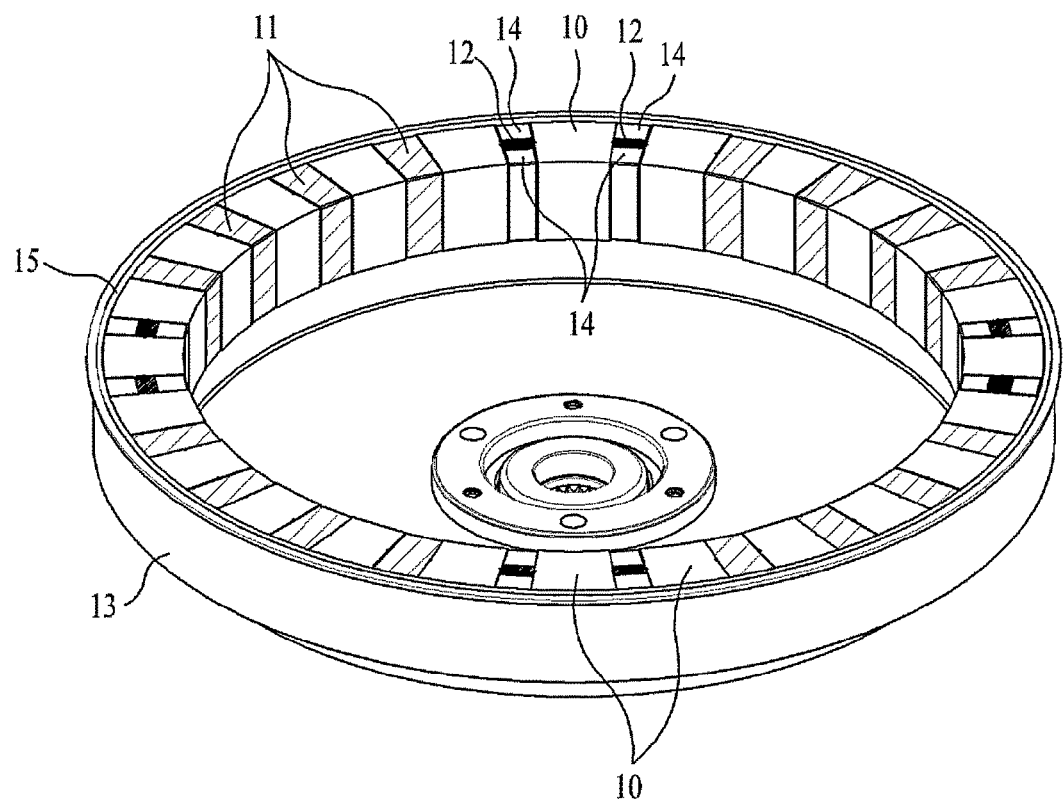
FIG. 2 is a perspective view of a rotor structure of the motor with the variable magnetic flux according to the present invention.

FIG. 1 is a plan view of a structure of a variable magnetic flux motor according to the present invention, and FIG. 2 is a perspective view of a structure of a rotor of a variable magnetic flux motor according to the present invention.

As shown in FIG. 1, the variable magnetic flux motor according to the present invention includes a rotor 1 and a stator 2.

The rotor 1 includes a plurality of unit rotor cores 10, first magnets 11, second magnets 12, and spacers, which are located on the outer circumferential surface of the stator 2. As shown in FIG. 2, the spacers 14 which surround the unit rotor cores 10, the first magnets 11 and the second magnets 12 are located on the inner side wall surface of an outer case 15 located on the inner side wall surface of a rotor housing 13.

In the present invention, the stator 2 includes a stator core base 21 and a plurality of teeth 22 radially formed on the outer peripheral surface of the stator core base 21.

A coil 3 is wound on the teeth 22 of the stator 2, and occupies some space in a slot formed between two neighboring teeth 22.

As shown in FIGS. 1 and 2, the motor according to the present invention adopts a type of 24 poles-18 slots, but the present invention is not limited to the above, and on occasion demands, the number of poles and slots may be varied.

In the case of the motor with 24 poles-18 slots, as shown in FIG. 1, twenty-four unit rotor cores 10 and twenty-four magnets 11 and 12 are located in turn. Out of the twenty-four magnets, sixteen magnets are the first magnets 11 and eight magnets are the second magnets 12. That is, the two second magnets 12 are mounted at sides of the four first magnets 11. As shown in FIG. 1, the unit rotor core 10 is located between the neighboring magnets, and the second magnets 12 are arranged in the direction of 12 o'clock, 3 o'clock, 6 o'clock, and 9 o'clock by twos. In other words, the second magnets are mounted at both sides of the unit rotor core which is opposed to the unit rotor core 10 located between the neighboring second magnets 12 (see the A part of FIG. 1), and the other two second magnets are mounted at both sides of two unit rotor cores where a connection line for connecting the two opposed unit rotor cores and a perpendicular line meet each other (see the B part of FIG. 1). Accordingly, total eight second magnets are applied.

The spacers 14 are located in the inner diameter direction and the outer diameter direction of the second magnets 12. The first magnets 11 occupy all of the space between the neighboring unit rotor cores 10, but the second magnets 12 occupy a part of the space between the neighboring unit rotor cores 10 and the spacers 14 occupy the remaining space. The spacers 14 are made of an insulating material, and preferably, insulating plastic resin. More preferably, the spacers 14 are manufactured by plastic resin molding integrally with the outer case 15. In the meantime, as shown in FIGS. 1 and 2, it is preferable that both ends of the second magnet 12 have the width crossing the space formed by the neighboring unit rotor cores 10 in such a way as to abut onto the two unit rotor cores 10 of both sides thereof.

The outer case 15 is formed in such a way as to get in contact with the outer circumferential surface formed by the unit rotor cores 10, the first magnets 11 and the spacers 14, and is located on the inner face of the rotor housing 13.

Preferably, the outer case 15 is made of an insulating plastic material. The outer case 15 is not essential and may be omitted as occasion demands.

In the present invention, the first magnets 11 are ferrite magnets, and the second magnets 12 are alnico magnets. Rotational characteristic of the motor can be regulated using a difference in coercive force between the first and second magnets of the two kinds.

Figure 3:
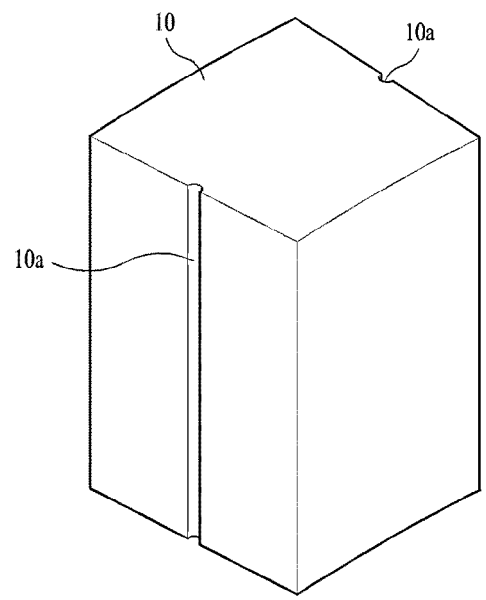
FIG. 3 is a perspective view of a unit rotor core used in the rotor of the motor with the variable magnetic flux.

FIG. 3 is a perspective view of the unit rotor core 10 used in the rotor 1 of the variable magnetic flux motor.

As shown in FIG. 3, the unit rotor core 10 according to the present invention has a structure that the magnets can be attached to both sides thereof, and a plurality of the magnets and a plurality of the unit rotor cores 10 are repeatedly attached so as to generally form a circular shape. In order to be attached to the neighboring magnet, the unit rotor core 10 may have weld lines 10a formed at both sides thereof. The magnet and the unit rotor core can be combined by laser welding along the wed lines 10a. Of course, the attachment method is not limited to the laser welding, and may be adopted from various attachment methods. For instance, caulking, compression or other welding methods may be applied.

Figure 4:
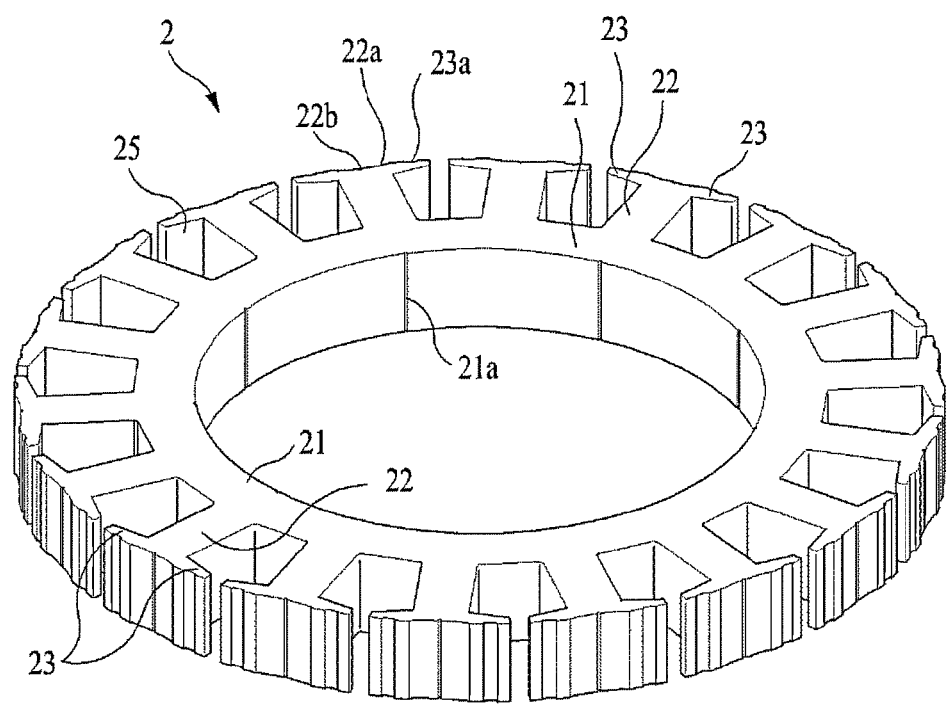
FIG. 4 is a perspective view of a stator of the motor with the variable magnetic flux.
Figure 5:
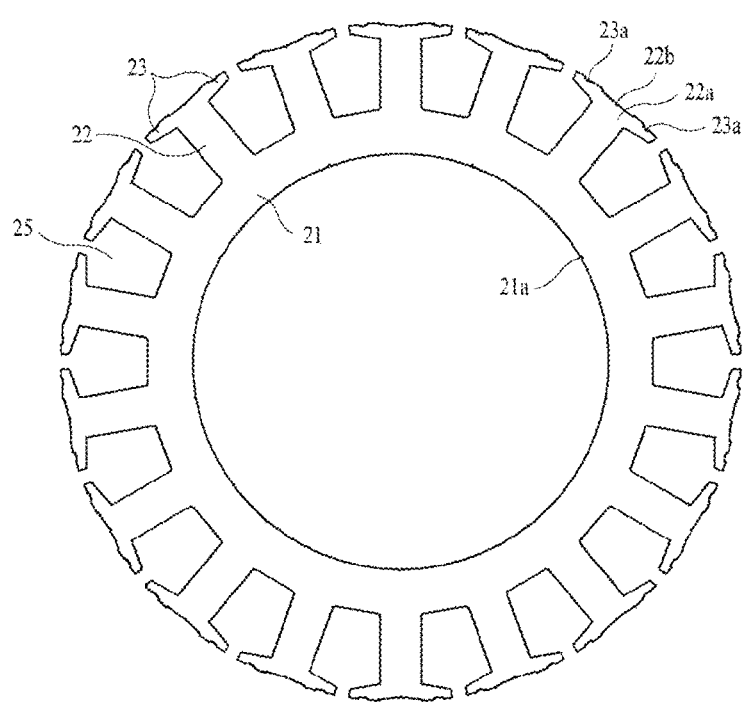
FIG. 5 is a plan view of the stator of the motor with the variable magnetic flux.

FIG. 4 is a perspective view of the stator 2 of the motor with the variable magnetic flux, and FIG. 5 is a plan view of the stator 2 of the motor with the variable magnetic flux.

As shown in FIGS. 4 and 5, the stator 2 according to the present invention includes the circular stator core base 21, and the teeth 22 radially arranged on the outer circumferential surface of the stator core base 21 at equal intervals. Each of the teeth 22 has ears 23 formed at both sides of an end thereof. The stator 2 is generally formed by core steel sheets laminated repeatedly. The stator core base 21 has a plurality of base welding slots 21a formed on the inner circumferential surface thereof, and laser welding is carried out along the base welding slots 21a so as to firmly fix a plurality of the core steel sheets. Of course, besides the laser welding, caulking or other welding method may be applied.

The space formed between the two neighboring teeth 22 forms a slot 25. The coil is wound on the teeth 22. In order to electrically insulate between the teeth 22 and the coil 3 before the coil is wound, an insulator (not shown) may be wrapped on the teeth 22. Each of the teeth 22 has a tooth recess 22a inwardly hollowed a little and formed on the outer peripheral surface of the end portion thereof, and each of the ears 23 formed at both sides of the end of the tooth 22 also has an ear recess 23a inwardly hollowed a little similarly with the tooth recess 22a. The tooth recess 22a and the ear recess 23a serve to reduce a cogging torque which can concentrically generate the amount of magnetic flux.

The tooth recess 22a has a tooth welding slot 22b, and the tooth welding slot 22b serves to combine the stator core sheets together through one of various welding methods like the base welding slots 21a which are described previously.

Figure 6:
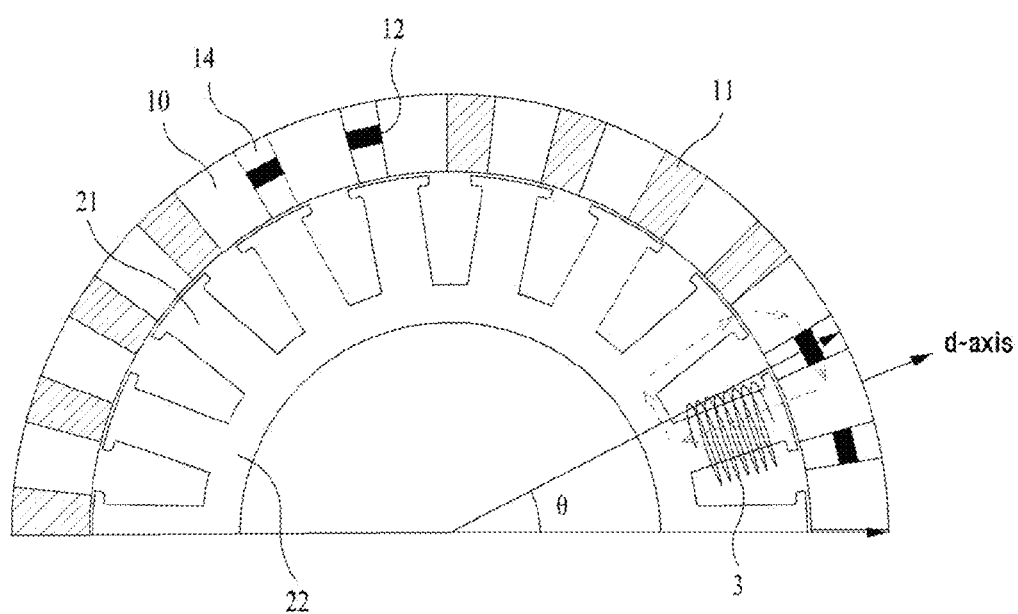
FIG. 6 is a conceptual view for explaining a change in magnetic flux of the motor.

FIG. 6 is a conceptual view for explaining a change in magnetic flux of the variable magnetic flux motor.

Referring to FIG. 6, when the part A of the stator is arranged on a d-axis between the second magnets 12 which are the alnico magnets, and then, the magnetizing current flows to magnetize the second magnets. On the contrary, in order to demagnetize, in the same way as the magnetization, the part A of the stator is arranged on the d-axis, and then, a negative (−) d-axis current flows in the opposite direction to the direction of a magnetomotive force.

Embodiment

In order to analyze demagnetization characteristic of the variable magnetic flux motor according to the present invention, the finite element analysis (FEA) was applied. After the motor with 24 poles-18 slots was manufactured, the FEA was applied under various analyzing conditions.

Figure 7:
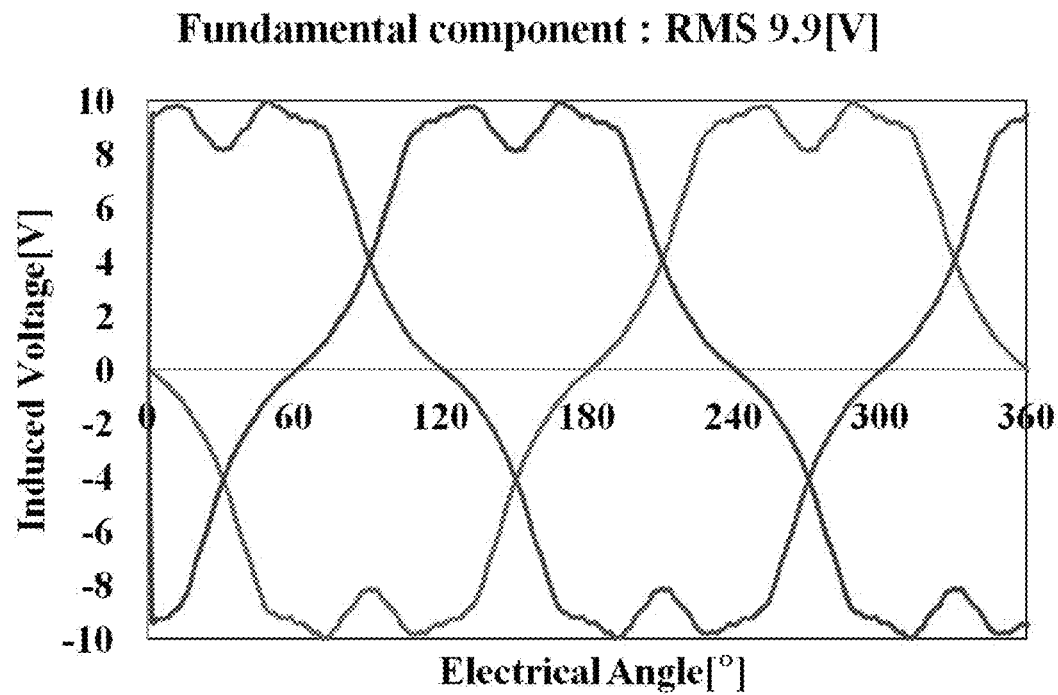
FIG. 7 is a graph showing a counter electromotive force in a magnetized state when the motor with the variable magnetic flux is in a no-load operation.

First, under a no-load operation, a counter electromotive force at 45 rpm in full magnetization of the alnico magnets was measured, and after that, the counter electromotive force was measured after the motor was operated at 45 rpm in a state where the alnico magnets were demagnetized. The measurement results were illustrated in FIGS. 7 and 8. FIG. 7 illustrates the measurement result at the time of the full magnetization and FIG. 8 illustrates the measurement result at the time that the alnico magnets were demagnetized.

Figure 8:
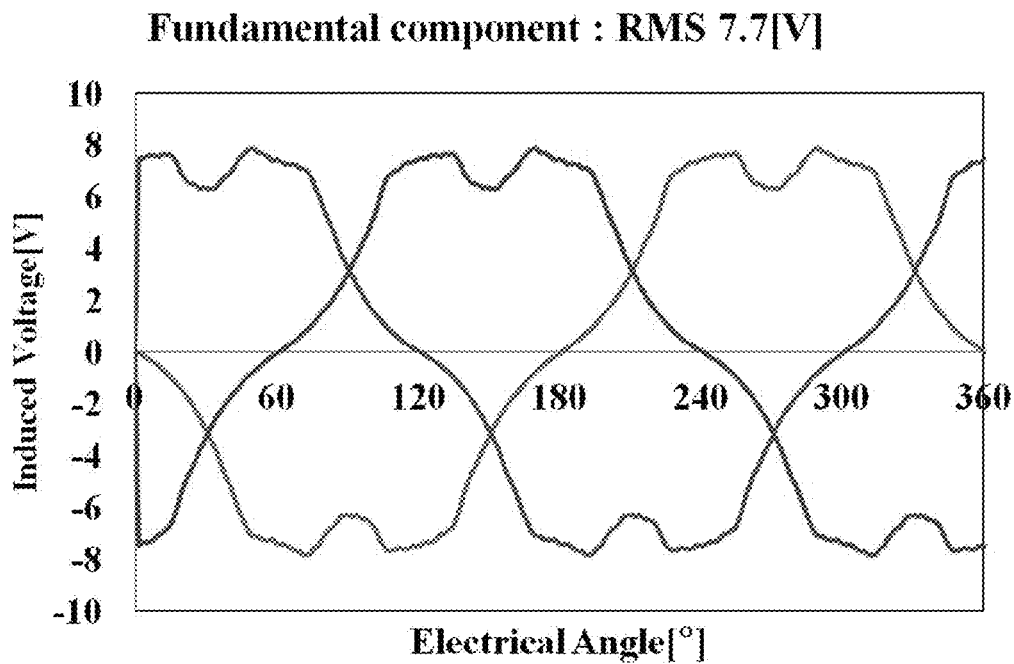
FIG. 8 is a graph showing a counter electromotive force in a demagnetized state when the motor with the variable magnetic flux is in a no-load operation.

As shown in FIGS. 7 and 8, the counter electromotive force at the time of full magnetization and the counter electromotive force at the time of demagnetization were compared with each other, and then, it was estimated whether or not a variable magnetic flux was possible. As a result, the counter electromotive force at the time of full magnetization was 9.9V and the counter electromotive force at the time of demagnetization was 7.7V, and hence, variable magnetic flux of about 22% was possible.

Figure 9:
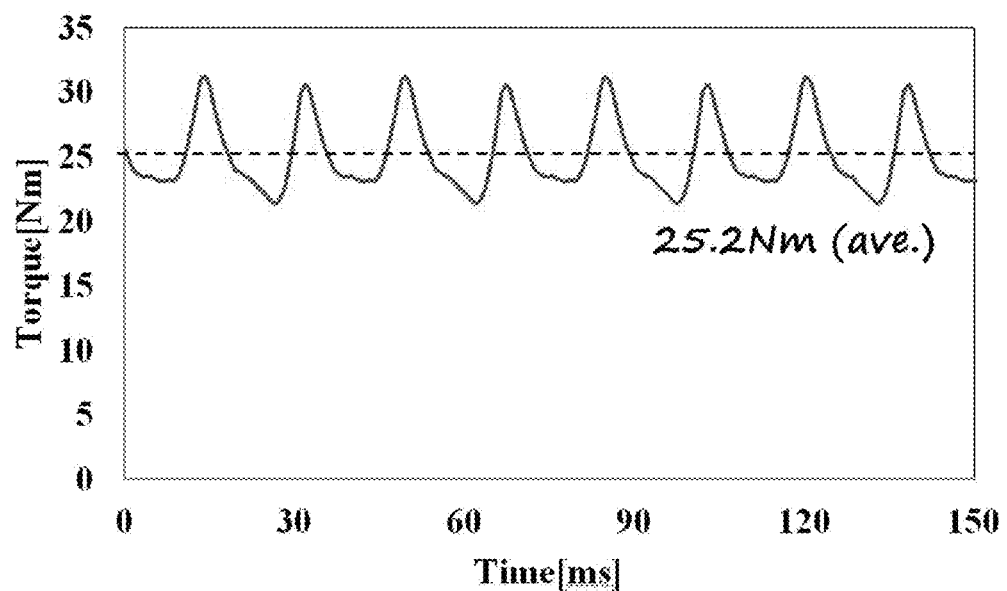
FIG. 9 is a graph showing a torque characteristic when the motor with the variable magnetic flux according to the present invention is operated at low speed.
Figure 10:
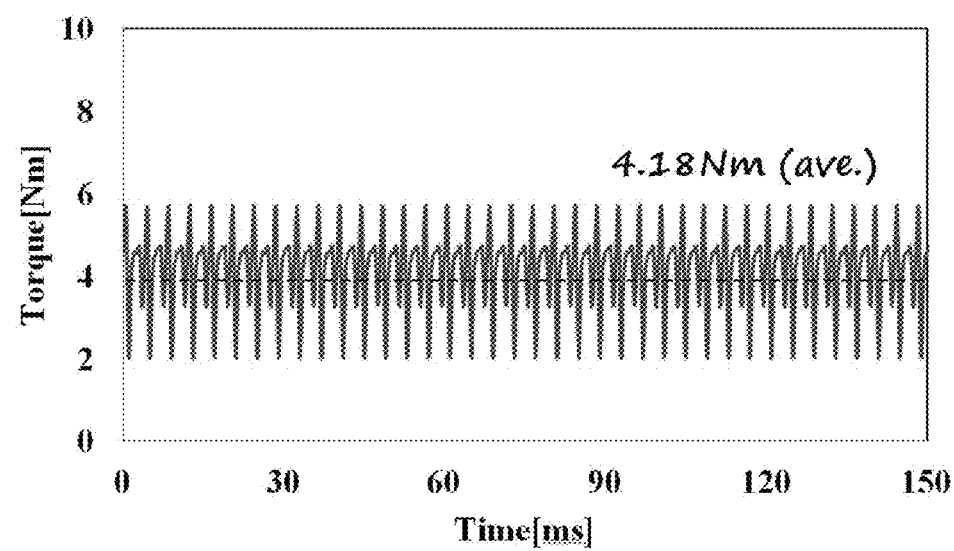
FIG. 10 is a graph showing a torque characteristic when the motor with the variable magnetic flux according to the present invention is operated at high speed.

Next, in order to analyze operation characteristics at low speed, torque during operation was estimated at 47 rpm and 1250 rpm. FIG. 9 illustrates torque characteristics under the low speed operation, and FIG. 10 illustrates torque characteristics under the high speed operation at 1259 rpm. The average torque was 25.2 Nm during the low speed operation but was 4.18 Nm during the high speed operation.

While the present invention has been particularly shown and described with reference to the preferable embodiment thereof, it will be understood by those of ordinary skill in the art that the present invention is not limited to the above embodiment and various changes or modifications may be made therein without departing from the technical idea of the present invention.

What is claimed is:

1. A motor with a variable magnetic flux, which includes a rotor and a stator located inside the rotor, wherein the rotor comprises a rotor housing, a plurality of unit rotor cores and magnets which are attached to the inner wall surface of the rotor housing, and the unit rotor cores and the magnets are arranged in turn, wherein the stator comprises a stator core base and a plurality of teeth radially formed on the outer peripheral surface of the stator core base at equal intervals, and each of the teeth has ears formed at both sides of an end thereof, wherein first magnets and second magnets mounted at outer perimeter of the rotor, in which four pairs of second magnets being arranged at every four first magnets, each pair of second magnets faced each other and each of the paired second magnets arranged by a right angle based on the rotor, and one of the plurality of unit rotor cores are formed between the first magnets, between the first and second magnets, and between the second magnets, wherein spacers are symmetrically formed at a front end and at a rear end based on the respective ones of the second magnets, the spacers being made of insulating material, and wherein the first magnets are ferrite magnets and the second magnets are alnico magnets, wherein a coercive force of the first magnets is different from a coercive force of the second magnets.

2. The motor according to claim 1, wherein the spacers occupy the remaining space of the space formed by neighboring unit rotor cores of the second magnets, except the space that the second magnets occupy.

\* \* \* \* \*